United States Patent [19]

Feinland et al.

[11] Patent Number: 4,787,046
[45] Date of Patent: Nov. 22, 1988

[54] MAILING SYSTEM HAVING A CAPABILITY FOR ONE-STEP POSTAGE METERING

[75] Inventors: Seymour Feinland, Stamford; Gerald C. Freeman, Darien; Timothy R. Erwin, West Redding, all of Conn.

[73] Assignee: Pitney Bowes Inc., Stamford, Conn.

[21] Appl. No.: 797,326

[22] Filed: Nov. 12, 1985

[51] Int. Cl.$^4$ ............. G01G 23/22; G06F 15/20
[52] U.S. Cl. ............... 364/464.03; 177/25; 364/466
[58] Field of Search ......... 364/464, 466, 567; 177/25, 61, 25.15

[56] References Cited

U.S. PATENT DOCUMENTS

| | | | |
|---|---|---|---|
| 3,890,492 | 6/1975 | Manduley et al. | 177/61 |
| 4,064,954 | 12/1977 | Rock | 177/25.15 |
| 4,180,856 | 12/1979 | Check, Jr. et al. | 364/466 |
| 4,241,407 | 12/1980 | Sookikian et al. | 364/567 |
| 4,301,507 | 11/1981 | Soderberg et al. | 364/464 |
| 4,301,878 | 11/1981 | Soe | 364/466 |
| 4,351,033 | 9/1982 | Uchimura et al. | 364/466 |
| 4,412,298 | 10/1983 | Feinland et al. | 364/466 |
| 4,519,048 | 5/1985 | Abellana et al. | 364/466 |
| 4,531,599 | 7/1985 | Wales et al. | 177/63 |
| 4,535,407 | 8/1985 | Eckert et al. | 364/466 |

FOREIGN PATENT DOCUMENTS 0099433 2/1984 European Pat. Off. .

Primary Examiner—Parshotam S. Lall
Assistant Examiner—Edward R. Cosimano
Attorney, Agent, or Firm—Robert H. Whisker; Melvin J. Scolnick; David E. Pitchenik

[57] ABSTRACT

A mailing system, including a postal scale and a postage meter controlled by the postal scale, and having one step metering capabilities. A postal scale controls a postage meter to set postage values as a function of the weight of an item to be mailed and, possibly, other postal information entered by an operator. The postage meter is physically mounted on the postal scale and the weight of the meter forms part of the tare weight of the scale. In one embodiment of the subject invention a letter placed in the meter will automatically be weighed and metered in a single step. In another embodiment of the subject invention the system also operates in a second mode wherein items placed on the system (i.e. on top of the meter) are weighed and postage values are computed in accordance with the weight and other postal information entered by an operator. Postal labels for packages, envelopes too thick to be weighed in the meter, or other items weighed, may then be printed upon command by the operator.

18 Claims, 8 Drawing Sheets

MAILING SYSTEM HAVING A CAPABILITY FOR ONE-STEP POSTAGE METERING

BACKGROUND OF THE INVENTION

This invention relates to mailing systems including postal scales and postage meters. More particularly, it relates to a mailing system which will weigh and meter (i.e. imprint metered postage indicia) an item to be mailed in a single operation.

Electronic postage meters are well known. Such meters imprint indicia representative of a selected postage amount on items to be mailed, or on tapes to be affixed to such items. Such meters are pre-set with a selected value representative of an amount paid to the USPS or other carrier and will dispense postage amounts selected by an operator only until the total dispensed equals the pre-set value.

Postal scales are also well known. Such scales are typically microprocessor controlled and compute the appropriate postage amount for an item to be mailed in accordance with the weight of such item, information input by an operator (e.g. class of service) and tables of postal rates stored in the microprocessor memory.

Electronic meters of the type described above are typified by the Model 6500 Electronic Postage Meter marketed by Pitney Bowes Inc. of Stamford, Conn. and such postal scales are typified by the Models 5820, 0-5 lb and 5890, 0-30 lb. Electronic Scales also marketed by Pitney Bowes Inc.

It is also well known to interconnect postal scales and postage meters so that the meter is set to a particular postage amount in accordance with the postage amount determined by the postal scale. Such a system is taught in U.S. Pat. No. 4,351,033, for: POSTAL CHARGE PROCESSING SYSTEM WHEREIN POSTAL CONDITION DATA IS SAVED AND REUSED FOR THE NEXT POSTAL PARACEL, by: Uchimura et al, issued: Sept. 21, 1982. U.S. Pat. No 4,301,507, for: ELECTRONIC POSTAGE METER HAVING PLURAL COMPUTING SYSTEMS, by: Soderberg et al, issued Nov. 17, 1981, which is hereby incorporated by reference, teaches an electronic postage meter having an interface for connection to an external control device such as a postal scale; the interface being substantially that of the above mentioned 6500 and 6900 Electronic Postage Meters.

The systems taught in the above references, and other similar systems well known to those skilled in the art, while effective, inherently involve a two-step process wherein an item to be mailed is first weighed then transferred to a postage meter for metering. To date, attempts to simplify this process and provide a one-step metering process have involved complex transport systems which move items through weigh stations, where the appropriate postage amount is computed, and then through a meter which has been set while the item is in transit. Such a system is taught in U.S. Pat. No. 3,890,492 for: POSTAGE VALUE DETERMINING AND CONTROL CIRCUIT by: Manduley, et al, issued: June 17, 1975.

Accordingly, it is an object of the subject invention to provide a mailing system with a capacity for one-step metering of items to be mailed.

It is another object of the subject invention to provide such a system which is simple to operate.

It is a further object of the subject invention to provide such a system without complex transport systems.

BRIEF SUMMARY OF THE INVENTION

The above objects are achieved and the disadvantages of the prior art are overcome in accordance with the subject invention by means of a mailing system which includes a postal scale for computing postage values as a function of the weight of the item to be mailed, and which generates signals representative of that computed value, and a postage meter connected to the scale for receiving the signals and imprinting indicia representative of the computed postage values. The meter is supported by the scale so that the weight of the meter forms a part of the tare weight of the scale. (By tare weight herein is meant the weight which is sensed by the scale transducer when no external load intended for weight determination is applied to the scale.)

In a preferred embodiment of the subject invention the system operates in an automatic mode so that when a letter is placed in the meter, the letter's weight is determined and the meter is automatically set with the appropriate postage for first class service (or some other preselected class of service) by the scale which then controls the meter to automatically imprint the appropriate postage indicia.

In another preferred embodiment of the subject invention, the system operates in a second mode to compute the appropriate postage values in accordance with the weight of an item placed on the system and other postal information, such as the destination desired, entered by an operator.

In still an other preferred embodiment of the subject invention, the subject meter includes a detector which generates an output signal when presence of an item properly positioned in the meter for imprinting of postage indicia is detected, and the output of this detector is transmitted to the postal scale. In this embodiment the system operates in the automatic mode when a detector output signal is received by the scale before a new weight or keyboard entry is detected; and operates in the second mode if a new stable weight or keyboard entry is received by the scale before a detector output signal. Thus, in this embodiment a package placed on top of the system would cause the scale to sense a new weight but would not cause a detector output; causing the scale to enter the second mode of operation and wait for input from an operator; while a letter placed in the meter would cause a detector output signal before a new stable weight was sensed and the system would automatically imprint the appropriate first class postage on the letter.

Thus, it can be seen that the system of the subject invention advantageously provides a system for simple, one-step metering of items to be mailed.

Other objects and advantages of the subject invention will be apparent to those skilled in the art from consideration of the attached drawings and the detailed description set forth below.

DETAILED DESCRIPTION OF PREFERRED EMBODIMENTS OF THE SUBJECT INVENTION

Figure 1:
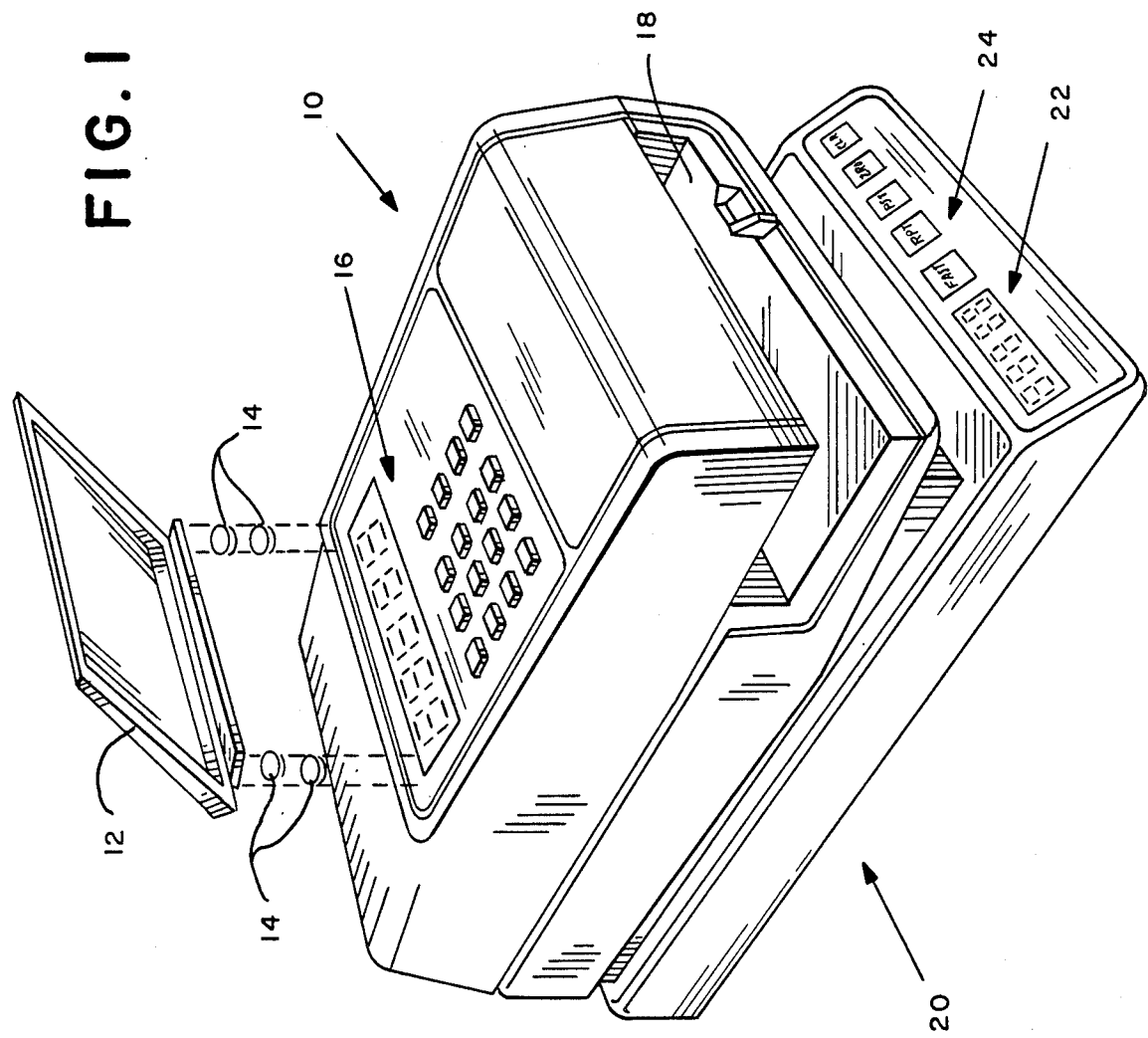
FIG. 1 is an isometric, partially exploded, view of a system in accordance with the subject invention.

FIG. 1 shows a mailing system in accordance with the subject invention. Postage meter (10) is mounted on scale (20) so that postage meter (10) forms a part of the tare weight of scale (20). Postage meter (10) and scale (20) are interconnected in a substantially conventional manner by cables (not shown) or other suitable means. Postage meter (10) is substantially identical to a Model 6900 Electronic Postage Meter marketed by Pitney Bowes Inc. of Stamford, Conn., with minor modifications which will be described more fully below. Scale (20) is substantially a conventional postage scale which computes first class postage rates in accordance with the weight of an item. Because postage meter (10) weighs approximately 20 lbs., scale (20) must include a load cell (not shown) having a maximum capacity of about 25-30 lbs. if the resulting system is to have a range of about 5 lbs. Alternatively, the system of FIG. 1 may be designed for use only with letters and small packages having a maximum weight of 8 ozs. or 1 lb.; substantially reducing the requirements on the load cell. Such load cells are readily available, as is evidenced by the Model 5890 marketed by Pitney Bowes Inc. which has a range of from 0-30 lbs. with sufficient accuracy to compute all postal rates over its full range. Such a scale, with appropriate software modifications, is almost directly substitutable into the system of FIG. 1.

As noted above, interconnection of postal scales and electronic postage meters is well-known in the art. Meter (10) and scale (20) are interconnected substantially in accordance with the interface specified in U.S. Pat. No. 4,301,507, incorporated by reference herein. This interface is modified slightly by provision for transmission of the state of trip detector 10-4 (described below) to scale (20). To minimize reprogramming of meter (10) this is preferably done by direct electrical connection of the output of the detector 10-4 to scale (20), however, programming of meter (10) to digitally transmit the information would be within the contemplation of the subject invention; and for meters such as the Model 6900, which already have a capacity to transmit the state of detector 10-4, would be preferred.

Cover (12) is fastened to the top of meter (10) to provide a flat surface on which large envelopes or small parcels which will not fit into throat (18) of meter (10) for metering may be placed for weighing. Cover (12) is hinged, so that an operator may access the keyboard or display of meter (10), and is removably fastened by fasteners (14,) which are preferably a Velcro TM type fasteners (or other easily disconnectable type fasteners) so that cover (12) may be removed when meter (10) is used in a stand-alone mode. Meter (10) also includes a full conventional keyboard and display (16) for use in a stand-alone mode, but which is disabled when meter (10) is used in the system of FIG. 1. Keyboard and display (16) may be disabled either by a command from scale (20) or by modifying meter (10) to detect connection of a communications cable connecting it to scale (20).

The system of FIG. 1 has a capacity for computing the postal rates which is limited to first class rates only.

As will be more fully described below, envelopes placed in throat (18) will be weighed and scale (20) will compute the appropriate first class rate and automatically command meter (10) to imprint the proper postage indicia. Large envelopes or small parcels which will not fit into throat (18) may be placed on cover (12) and will be weighed and the weight displayed in display (22). Appropriate postage indicia may then be printed on a label by inserting the label in throat (18) after (or before) depressing the PRINT key of controls (24) which fixes the postage rate.

Alternatively, the REPEAT key may be depressed if a number of identical tapes are to be printed. The POSTAGE key allows the computed postage to be displayed on display (22), the ZERO key zeros scale (20) and the CLEAR key returns the system to its initial condition.

Figure 2:
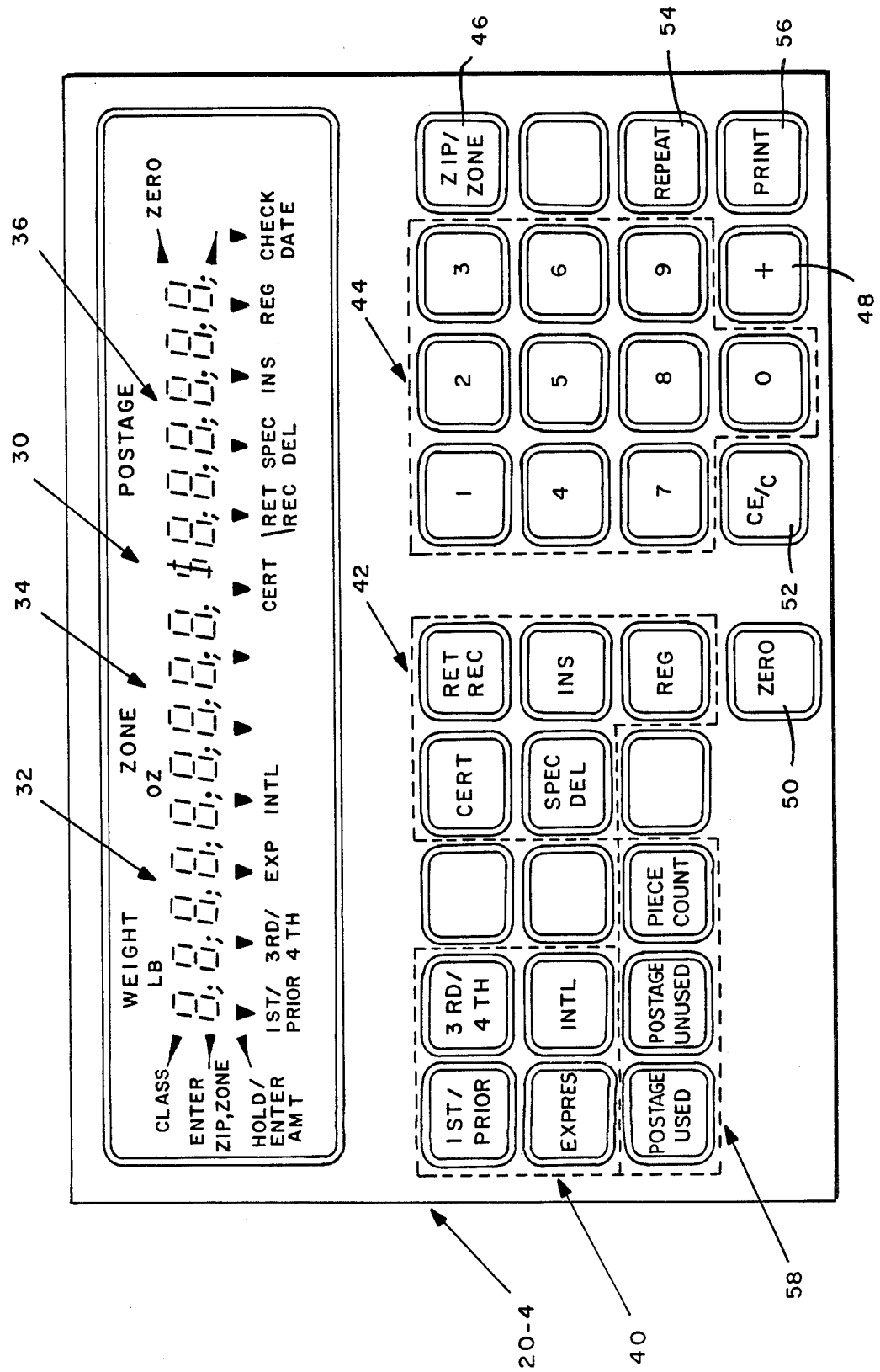
FIG. 2 is a plan view of the keyboard and display used in another embodiment of the subject invention.

FIG. 2 shows keyboard and display 20-4 used in another embodiment of the subject invention having increased capabilities but otherwise similar to the embodiment of FIG. 1. Display (30) includes a section (32) for displaying the weight, a section (34) for displaying the destination zone, and a section (36) for displaying the postage. Display (30) also includes a number of indicators and prompts which are illuminated either to indicate the status of the postal data that has been entered or to prompt the operator to take some action.

Keyboard 20-4 is expanded to allow the operator to enter additional postal information. Keys (40) allow the operator to select a class of service, keys (42) allow the operator to choose various special services such as certified mail, return receipt requested, etc., and numeric keys (44) allow the operator to enter numerical values as necessary. ZIP/ZONE key (46) controls the system to compute the destination zone for an item from entry of its zip code. Add key (48) allows the operator to add a fixed amount to the postage to cover special services which are not programmed into the system. ZERO key (50), CLEAR key (52), REPEAT key (54) and PRINT key (56) function as described above and will be described more fully below. Keys (58) request meter (10) to transmit the amounts of postage used, the amounts of postage remaining and the number of items metered back for display in section 36 of display (30) in a conventional manner.

It is possible to implement another preferred embodiment using postage meters such as the Model 6900 which respond to external messages to enable or disable the keyboard, or to enable and disable the meter (i.e. the capacity to print postage indicia). In such an embodiment keyboard and display 16 may normally be enabled so that an operator may use them for meter functions such as retrieving totals of used and unused postage. Keyboard 16 is disabled before meter 10 is enabled so that keyboard 16 cannot be used to control meter 10 to print postage indicia, as will be described more fully below. Because meter 10 may also have a capacity for use as a stand-alone meter it is normally programmed so that the meter is enabled in the power-up routine. To prevent meter 10 from being inadvertently enabled to print, for example after a momentary power failure, scale 20 is preferably programmed to periodically, several times per second, send messages to meter 10 to disable the meter.

Those skilled in the art will recognize that the operation of the sytem of FIG. 2 is substantially similar to the operation of conventional postal scales such as the Model 5820, 0-5 lb. scale marketed by Pitney Bowes Inc., and, except for matters which will be discussed in more detail below, need not be described further here for an understanding of the subject invention.

Figure 3:
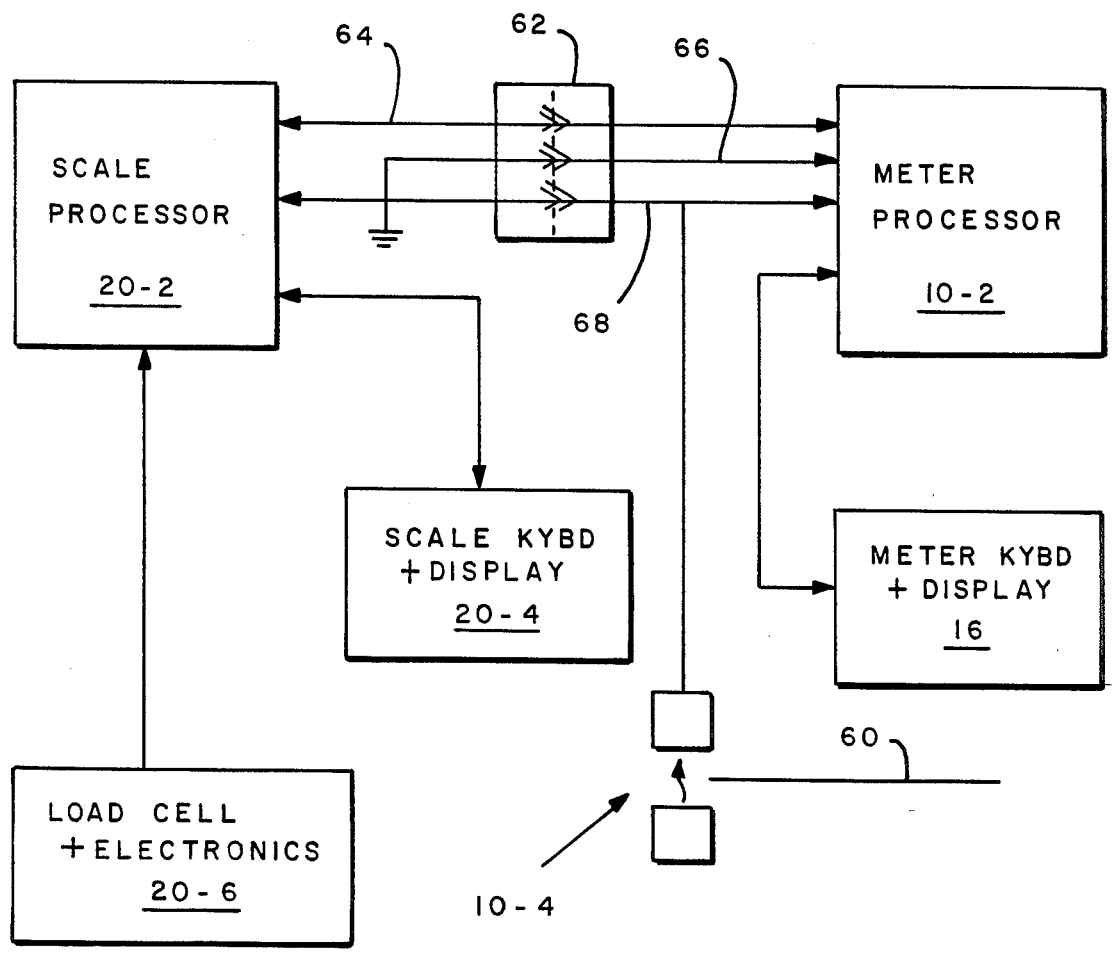
FIG. 3 is a schematic block diagram showing the interconnection of various elements with the processors of the subject invention.

FIG. 3 shows a schematic representation of the interconnections, or data flows, between various elements of the system of FIG. 2. (It should be noted that FIG. 3 is not intended to suggest or preclude any particular form of physical interconnection between elements (e.g. bus, multiplexed, etc.)).

Scale processor 20-2 is connected in a conventional manner to load cell 20-6 and associated electronics to receive weight data. It is also connected to keyboard and display 20-4 in a conventional manner to receive input from and display information to, an operator. Scale processor 20-2 is programmed to process the weight data and operator inputs to compute postage values in accordance with well known techniques similar to those described above.

Meter processor 10-2 is connected to meter keyboard and display 16 in a conventional manner to receive inputs from, and display information to, an operator It is also connected to detector 10-4 to detect when item 60 is properly positioned to be metered. Detector 10-4 and connection thereto are conventional and detector 10-4 will typically comprise one or more electro-optical devices.

Those skilled in the art will recognize that, as described, meter 10 and scale 20 (if re-zeroed) are capable of operating as a conventional independent postage meter and postal scale respectively. The embodiment of the subject invention shown in FIG. 2 is formed when meter 10 is supported on scale 20, meter 10 and scale 20 are interconnected through connector 62, and processor 20-2 is further programmed to control meter 10, as will be described below.

When connection between meter 10 and scale 20 is established through connector 62 a serial data link 64 is established. Link 62 allows processor 20-2 to control meter 10 remotely in a manner similar to that described in U.S. Pat. No.: 4,301,507. It should be noted that the Model 6900 postage meter to be marketed by Pitney Bowes Inc. and other such meters includes provision for remote operation by a postal scale or other device.

Connector 62 also connects a ground (or other appropriate potential) to processor 10-2 on line 66. Processor 10-2 responds to the ground potential on line 66 to disable keyboard and display 16. Connector 62 also connects the output of detector 10-4 to processor 20-2 through line 68 to provide a TRIP signal for use by processor 20-2, as will be described below.

Alternatively, lines 66 and 68 may be omitted for meters such as the Model 6900 which include a capability to enable and disable keyboard 16 in response to external messages, and to transmit the status of detector 10-4 as a message.

Turning to FIGS. 4a through 4d the operation of the system of FIG. 2 is shown in flow chart form. The system enters the start up state S upon occurence of a power up, time out, or entry of a CLEAR command by an operator. (In considering the flow chart described below, it should be understood that timeout and CLEAR are implicit in the description and their occurance at any point will cause a return to S).

At 100 the system displays "AUTO" in section 36 of display (30) to indicate that any letter placed in throat (18) will be automatically metered. At 102 the system, which is controlled by the processor of scale (20) checks the status of the trip detector (not shown). If there is no TRIP (i.e. nothing is properly positioned in throat (18) ) the scale checks for an NEW WEIGHT at 104 and for data entry from the keyboard at 106. If neither has occurred the system continues to loop through 100.

By NEW WEIGHT herein is meant a stable non-zero weight which is detected after the scale detects motion indicating that a new item has been placed on the scale. Those skilled in the art will recognize that the processor of scale (20) is also programmed to implement the weighing algorithm which detects motion and determines when a new stable weight has been found. Such routines are well known and, given the speed the currently available microprocessors operate, may easily be implemented to run concurrently with the routines described herein. A typical algorithm is described in U.S. Pat. No. 4,412,298, for: METHOD FOR TRACKING CREEP AND DRIFT IN A DIGITAL SCALE UNDER FULL LOAD, and further description of the weighing function of scale (20) is not believed necessary for an understanding of the subject invention.

If TRIP is detected at 102 the system loops at 108 until a NEW WEIGHT is detected. The system then computes the new first class postage as a function of the NEW WEIGHT, sets AMOUNT equal to the new postage and sends a message "SET AMOUNT AND PRINT" to meter (10) at 110. The system then continues to loop through 100.

It should be understood that the "SET AMOUNT AND PRINT" message may actually imply a sequence of messages. Thus in embodiments including a Model 6900 meter, as described above, the sequence would be: Disable Keyboard; Enable Meter; Set Amount; Print; Disable Meter; Enable Keyboard.

Figure 4A:
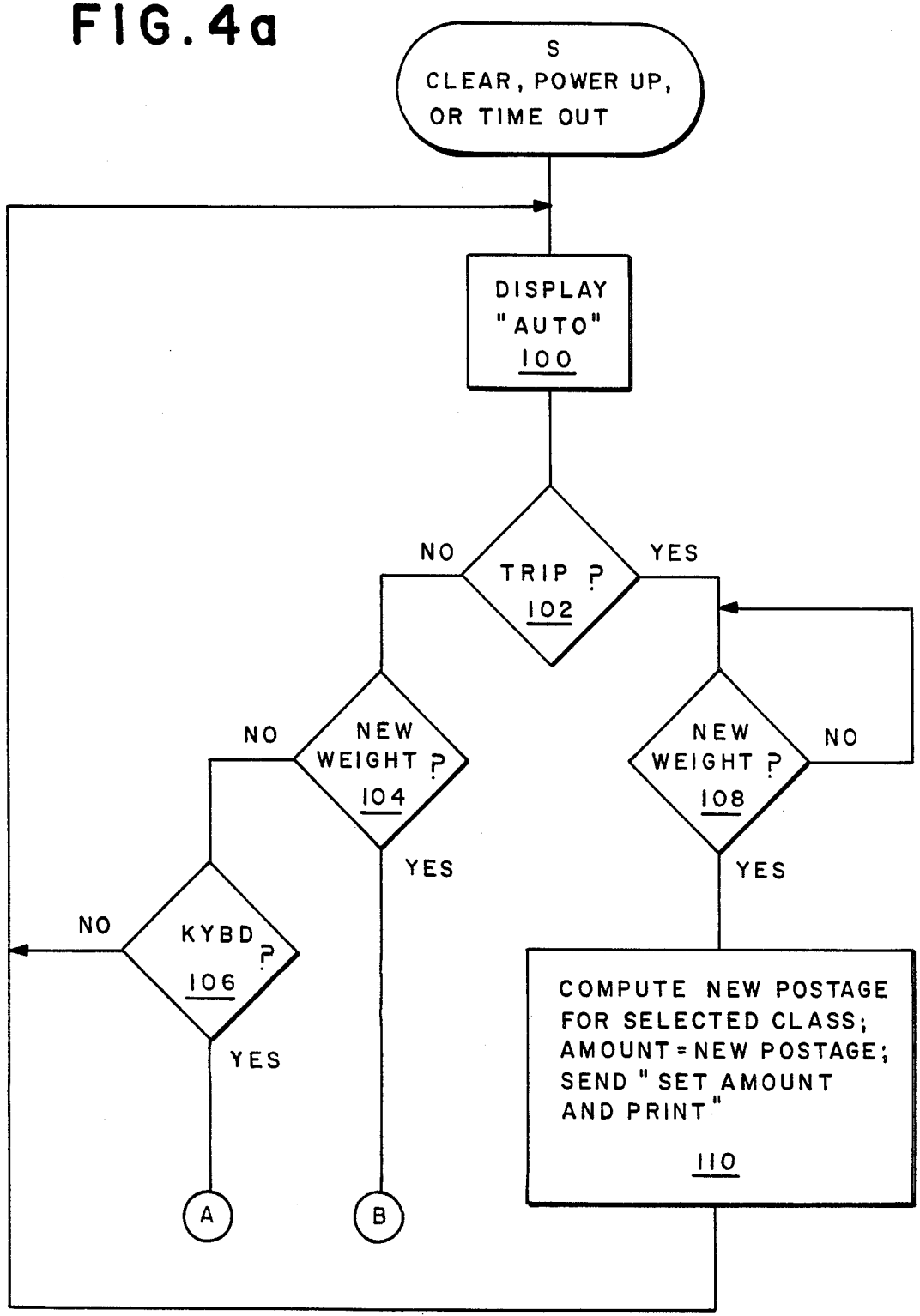
FIGS. 4a through 4d show a flow chart depicting the operation of an embodiment of the subject invention.
Figure 4B:
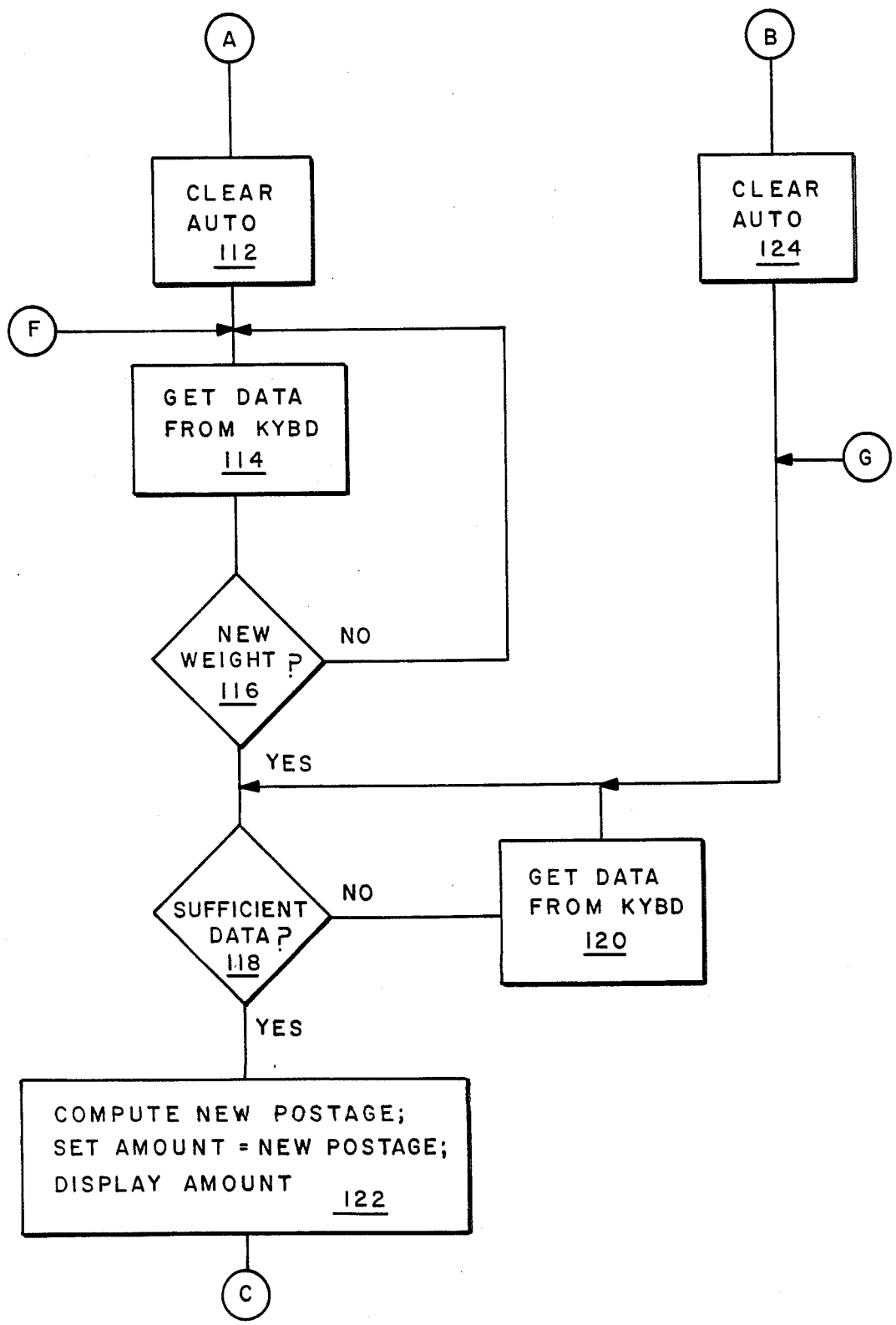
Figure 4C:
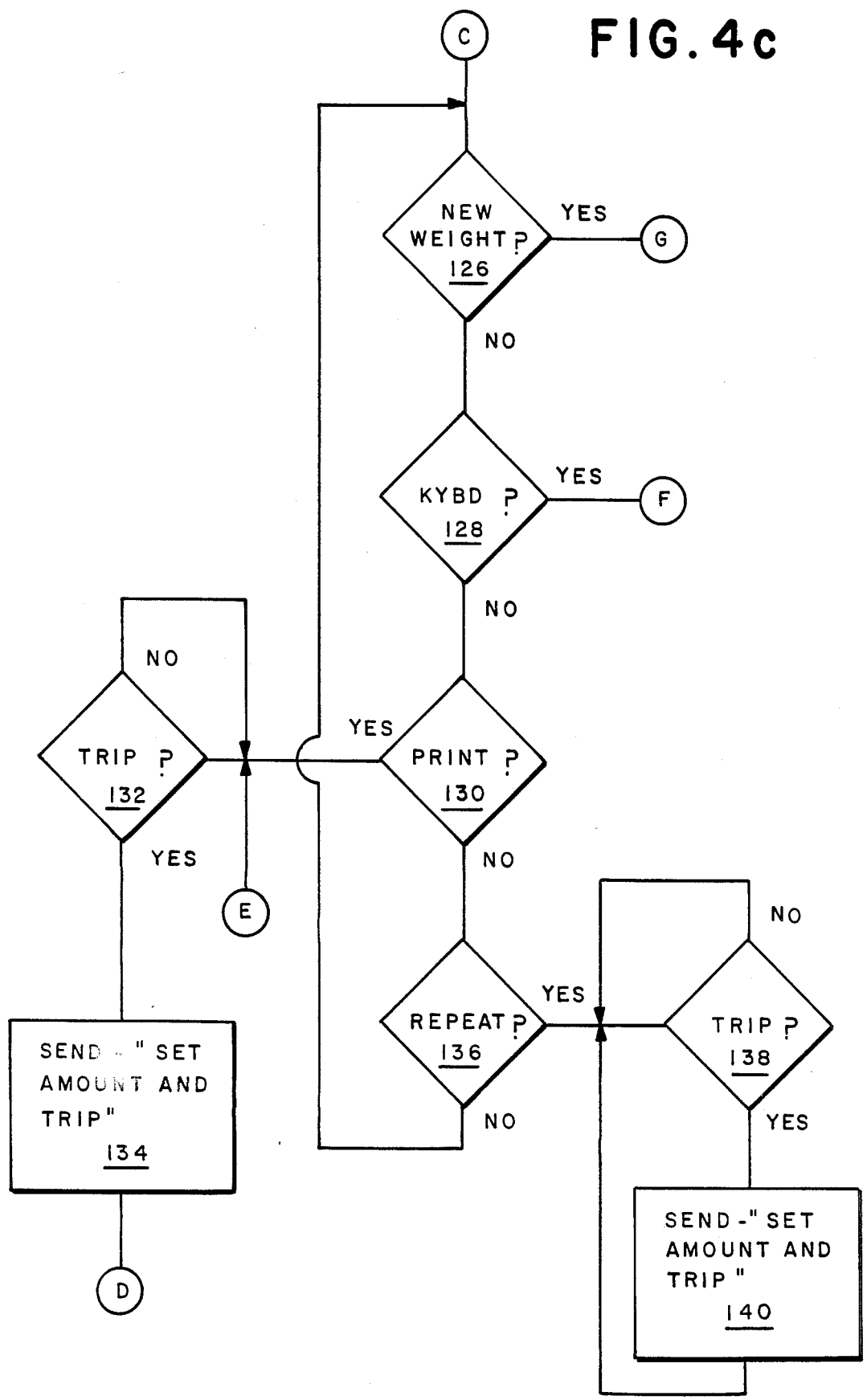

If entry of data through the keyboard is detected at 106 the system goes to A in FIG. 4b or if NEW WEIGHT is detected at 104, the system goes to B in FIG. 4b. Turning to FIG. 4b at 112, the system clears "AUTO" at 112 and gets data from the keyboard at 114. At 116 the system checks for NEW WEIGHT. If no NEW WEIGHT is found the system loops back through 114 for more data if available. If NEW WEIGHT is found at 116, the system checks to see if sufficient data is available to compute a postage at 118. If the data is not sufficient, it loops through 120 to get more data. When the data is sufficient at 122, the system computes a new postage as a function of the NEW WEIGHT and the data entered through the keyboard; sets AMOUNT equal to the new postage; and displays AMOUNT in section 36 of Display (30) at 122, then goes to C in FIG. 4c.

If the system enters through B at 124 "AUTO" is cleared and the system goes to 118 and continues as described above.

From C the system checks for NEW WEIGHT at 126. If NEW WEIGHT is detected, the system returns to G in FIG. 4b, thus allowing the operator to change the item being weighed if, for example, an error has been made. Otherwise the system continues to 128. At 128 the system again checks for data being entered from the keyboard. If data is being entered the system returns to F in FIG. 4b, thus allowing the operator to enter new additional data such as a request for special services. Otherwise the system continues to 130. At 130 the system checks to determine if the operator has entered a PRINT command and at 136 it checks to determine if the operator has entered a REPEAT command. If neither command has been entered the system loops through 126.

If the REPEAT command has been entered, the system checks for a TRIP at 138. If no TRIP is detected the system continues to loop through 138. When a TRIP is detected the system sends a "SET AMOUNT AND PRINT" command to meter (10) at 140 and returns to loop through 138. Thus, it can be seen that once a REPEAT command is given each item inserted into throat (18) will automatically be imprinted with identical postal indicia.

It should be noted that the PRINT and the REPEAT commands fix the AMOUNT so that subsequent weight changes do not affect AMOUNT until the postal indicia are imprinted. This avoids the possibility that accidental jarring of the system when inserting a label will affect the postage printed, and allows envelopes to be weighed on pan 12 with special fees and rates entered via the keyboard as desired; and, after the PRINT or REPEAT command is entered, inserted in throat 18 for metering.

If a PRINT command is detected at 130 the system tests for TRIP at 132. If no TRIP is detected the system loops through 132. When TRIP is detected the system sends "SET AMOUNT AND PRINT" to meter (10) at 134 and goes to D in FIG. 4d.

Figure 4D:
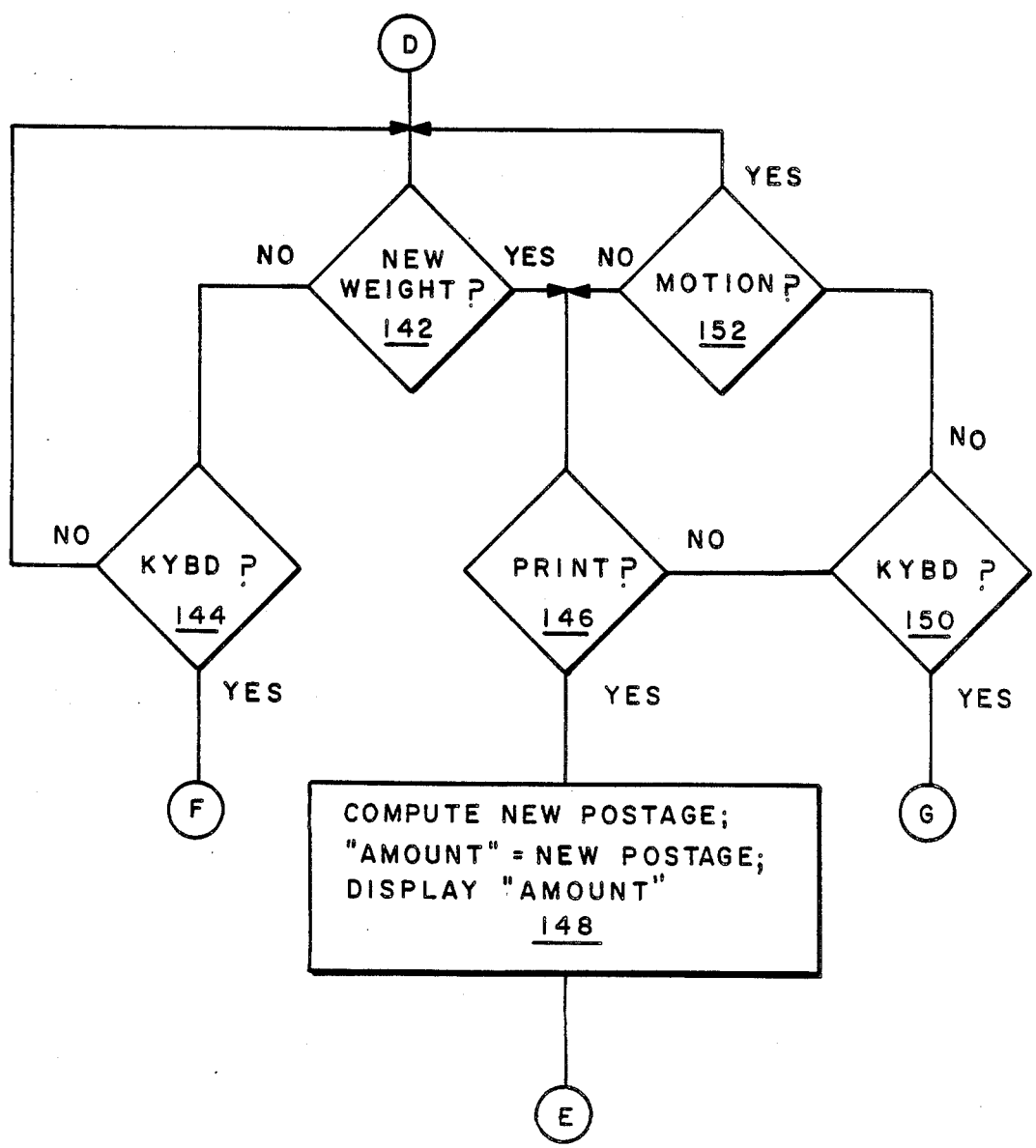

In FIG. 4d the system checks for NEW WEIGHT at 142 and for data entry from the keyboard at 144. If neither is detected the system continues to loop through 142. If data entry is detected at 144 the system returns to F in FIG. 4b to determine a new postage. If NEW WEIGHT is detected at 142 the system determines if PRINT command has been entered at 146. If a PRINT command has been entered at 148 the system computes a new postage and sets the AMOUNT equal to the new postage and displays AMOUNT in section 36 of display (30), and returns to E in FIG. 4c, where it tests for TRIP at 132. Thus an operator may print postage labels for a series of items of different weight using one set of data originally entered simply by pressing the PRINT key for each new item. If no PRINT command is detected the system tests for data entry from the keyboard at 150 and if data entry is detected returns to G in FIG. 4b to determine new postage. If no data entry is detected at 150 the system checks for MOTION (indicating a change in weight) at 152. If no MOTION is detected at 152 the system loops through 146 and if MOTION is detected at 152 the system loops through 142 to again test for NEW WEIGHT. This test for MOTION allows the operator to change the item without the need to exit from the PRINT cycle.

Those skilled in the art will recognize that the operation of the system of FIG. 1 would be essentially similar except that no data would be entered from the keyboard since the system of FIG. 1 always assumes first class (or some other preselected class).

Figure 5:
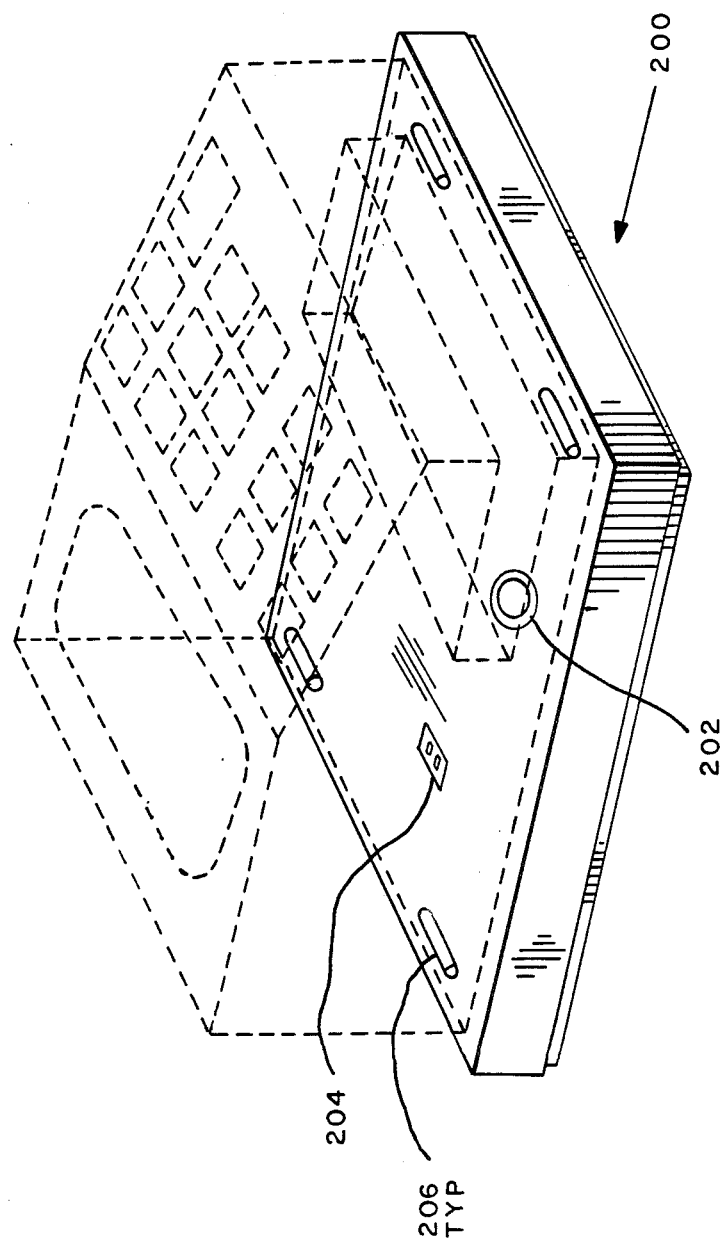
FIG. 5 is an isometric view of a scale used in still another embodiment of the subject invention, having a postage meter shown in phantom.

FIG. 5 shows a scale platform (200) which is used in a third embodiment of the subject invention. In this third embodiment a meter (shown in phantom) would be redesigned to incorporate a keyboard similar to that shown in FIG. 2 and to incorporate the above-described control program in the meter processor. Such changes would be relatively simple and easily within the abilities of ordinary skill in the art; amounting actually to no more than a repositioning of the control functions from the scale unit to the meter unit of the system. This would allow platform (200) to be a simple scale platform providing only weight information to the system.

When the meter is mounted on platform (200) data communication would be through a conventional electro-optical device (202) mounted in the top surface of platform (200) to align with a corresponding device in the base of the meter. Similarly, power would be supplied to the meter through a power connection (204). Guides (206) are provided to assure that the meter and platform (200) are properly aligned.

The above descriptions and the attached drawings have been provided by way of illustration only and will suggest numerous other embodiments of the subject invention to those skilled in the art. Particularly, they will be aware that details of the operating sequences described above may be rearranged or modified without departing from the spirit of the subject invention. Accordingly, limitations on the subject invention are to be found only in the claims set forth below.

What is claimed is:

1. A mailing system comprising:
   (a) a postal scale for computing postage values as a function of the weight of an item to be mailed, and for generating signals representative of said computed value;
   (b) a postage meter connected to said scale for receiving said signals and imprinting indicia representative of said computed postage value in accordance with said signals; and
   (c) said meter is supported by said scale so that the weight of said meter is part of the tare weight of said scale.

2. A mailing system as described in claim 1 wherein the top surface of said meter comprises a flat surface upon which objects may be weighed.

3. A mailing system as described in claim 1 wherein said meter includes control panel for input of control signals by an operator, and wherein said control panel is disabled when said meter is connected to said scale and is enabled when said meter is disconnected from said scale; whereby said meter may be operated in a stand-alone mode when disconnected from said mailing system.

4. A mailing system as described in claim 1 wherein said system functions in a first mode of operation to compute a new postage value in response to detection of a new weight.

5. A mailing system as described in claim 4 wherein said system functions in a second mode of operation to compute a new postage value in response to information entered by an operator and detection of a new weight.

6. A mailing system as described in claim 1 wherein said meter further comprises detector means for detecting a item properly positioned to receive the imprint of said indicia, and wherein further said scale additionally provides a print signal; said meter imprinting said indicia only in response to receipt of said print signal and detection of said properly positioned item.

7. A mailing system as described in claim 6 wherein said meter includes a control panel for input for control signals by an operator and wherein said meter is initially disabled to imprint said indicia, and wherein said print signal comprises:
   (a) a first command to disable said control panel;
   (b) a second command to enable said meter to imprint said indicia;
   (c) a third command to set the indicia to represent the computed postage value;
   (d) a fourth command to imprint said indicia;

(e) a fifth command to disable said meter to imprint said indicia; and, (f) a sixth command to enable said control panel.

8. A mailing system as described in claim 6 wherein said scale means includes means for the optical transmission of said representative signals and said meter includes means for the optical reception of said representative signals, and wherein said optical transmission means and optical reception means are optically aligned when said meter is mounted on said scale.

9. A mailing system as described in claim 6 wherein said scale includes means for receiving an output signal from said detector means when said item is properly positioned for imprinting.

10. A mailing system as described in claim 9 wherein said system functions in a first mode of operation to compute a new postage value and generate said print signal in response to detection of a new weight.

11. A mailing system as described in claim 10 wherein said system enters said first mode in response to detection of said output signal of said detector means prior to detection of said new weight.

12. A mailing system as described in claim 6 wherein said system functions in a first mode of operation to compute a new postage value and generates said print signal in response to detection of a new weight.

13. A mailing system as described in claim 12 wherein said system functions in a second mode of operation to compute a new postage value in response to information entered by an operator and detection of a new weight.

14. A mailing system as described in claim 13 wherein said system operates in said second mode in response to detection of a new weight or entry of information by said operator prior to detection of said detector means output signal.

15. A mailing system as described in claim 14 wherein said system remains in said second mode until a clear signal is generated by said operator or until a power-up or time-out occurs.

16. A mailing system as described in claim 13 wherein said scale generates said print signal in response to an operator input.

17. A mailing system as described in claim 16 wherein said system operates in said second mode in response to detection of a new weight or entry of information by said operator prior to detection of said detector means output signal.

18. A mailing system as described in claim 17 wherein said system remains in said second mode until a clear signal is generated by said operator or until a power-up or time-out occurs.

* * * * *